United States Patent [19] [11] 4,352,613
Bertolini [45] Oct. 5, 1982

[54] GEAR OPERATED TWIST LOCK

[76] Inventor: William A. Bertolini, 115-65 Undercliff Ter., Kinnelon, N.J. 07405

[21] Appl. No.: 213,836

[22] Filed: Dec. 5, 1980

Related U.S. Application Data

[63] Continuation-in-part of Ser. No. 205,590, Nov. 10, 1980.

[51] Int. Cl.³ .................................................. B60P 7/013
[52] U.S. Cl. .......................................... 410/82; 24/287; 220/1.5
[58] Field of Search .................. 410/82, 83, 68–81, 410/84; 224/315, 324; 296/35.1, 35.2, 35.3; 292/140, 142; 220/1.5 X; 24/287 X

[56] References Cited

U.S. PATENT DOCUMENTS

| 2,240,802 | 5/1941 | Sandberg et al. | 74/537 |
| 2,264,954 | 12/1941 | Sandberg | 74/537 |
| 3,737,135 | 6/1973 | Bertolini | 410/82 |
| 3,753,591 | 8/1973 | Pratt | 410/79 |
| 3,768,857 | 10/1973 | Horton | 410/83 |
| 4,023,504 | 5/1977 | Grey | 410/82 |

FOREIGN PATENT DOCUMENTS 2436239 5/1980 France ........................... 292/142

Primary Examiner—Joseph F. Peters, Jr.
Assistant Examiner—M. J. Hill
Attorney, Agent, or Firm—Max R. Millman

[57] ABSTRACT

A twist lock for removably retaining a standardized container on a chassis in which a first gear quadrant is mounted on a shank of the lock for rotation therewith, a second gear quadrant is mounted for rotation within the chassis bolster and engaging the first gear quadrant, a handle to rotate the second gear quadrant and a latch mechanism associated with the handle whereby movement of the handle in one direction will rotate the twist lock 90° to its locking position within the corner member of the container, and movement of the handle in the opposite direction will rotate the lock back to its unlocked position. The actuating mechanism of the lock is confined within the envelope of the bolster so that the handle wll not protrude behind the rear of the chassis and can be installed in a position in which the dirt, salt and splash of the rear wheels will be kept out of the actuating mechanism.

10 Claims, 7 Drawing Figures

GEAR OPERATED TWIST LOCK

This is a continuation-in-part of my copending application Ser. No. 205,590 filed Nov. 10, 1980.

This invention relates to a twist lock for removably and securely retaining a standard container on a chassis of the type shown and described in my U.S. Pat. No. 3,737,135.

In the containerization field, a standard chassis is used to lockingly and removably mount a standardized container. Twist locks are provided adjacent the ends of the front and rear bolsters to engage the corresponding hollow corner members of the container. The common type of twist locks now in use contain a handle for the actuating mechanism which protrudes in the open position with the actuating mechanism facing the tires at the rear.

The primary object of the invention is to provide a twist lock mechanism which not only provides the mechanical advantage of gear operation but is also so constructed that all the operating mechanism is confined within the envelope of the bolster so that there are no protruding parts in the locking or unlocking positions of the twist lock.

Another object of the invention is to provide a gear operated twist lock mechanism in which access to the handle operation is exposed either from the rear or the front of the chassis bolster under the container, thereby simplifying operation and inspection. Thus, quicker visual inspection can be made to determine if the container is in the locked position. The operating mechanism is kept free of dirt, salt and road splash from the rear wheels when access to the handle operation is through an opening in the rear wall of the bolster and the front wall which confronts the rear tires is solid.

Another object of the invention is to provide a gear operated twist lock mechanism which is neither right nor left handed so that the rear handles are interchangeable with the front handles thereby effecting economy of maintenance and inventory.

The foregoing objects are obtained by providing a locking pin having a shank with a head thereon, the shank extending through the top wall of a chassis bolster and mounted for axial rotation thereon, a first gear quadrant or sector mounted on and for rotation with said shank and disposed within the bolster, a second gear quadrant or sector disposed within the bolster, meshing with the first gear quadrant and mounted for rotation around an axis parallel to that of the shank, a handle extending from the second gear quadrant and latch means to selectively latch and unlatch the second gear quadrant whereby when unlatched and the handle is moved in one direction the shank and head will twist 90° to a locking position and reverse movement of the handle will twist the shank and head back to its unlocking position, the latch, handle and gear quadrants being confined at all times within the envelope of the bolster.

These and other objects of the invention will become more apparent as the following description proceeds in conjunction with the drawings, wherein.

Specific reference is now made to the drawings in which similar reference characters are used for corresponding elements throughout.

Figure 1:
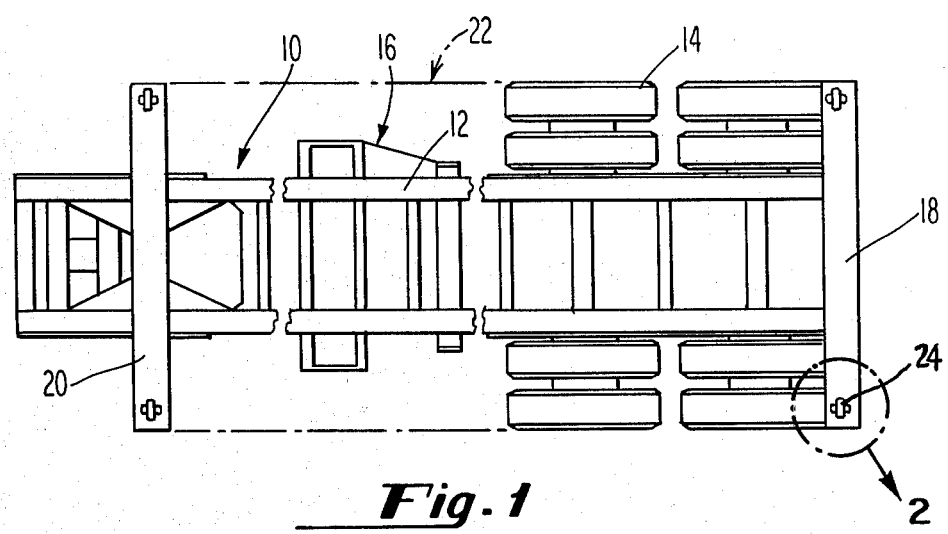
FIG. 1 is a top plan diagrammatic view of a conventional chassis with the instant twist lock mechanisms in place in the bolsters and the container shown in phantom.
Figure 2:
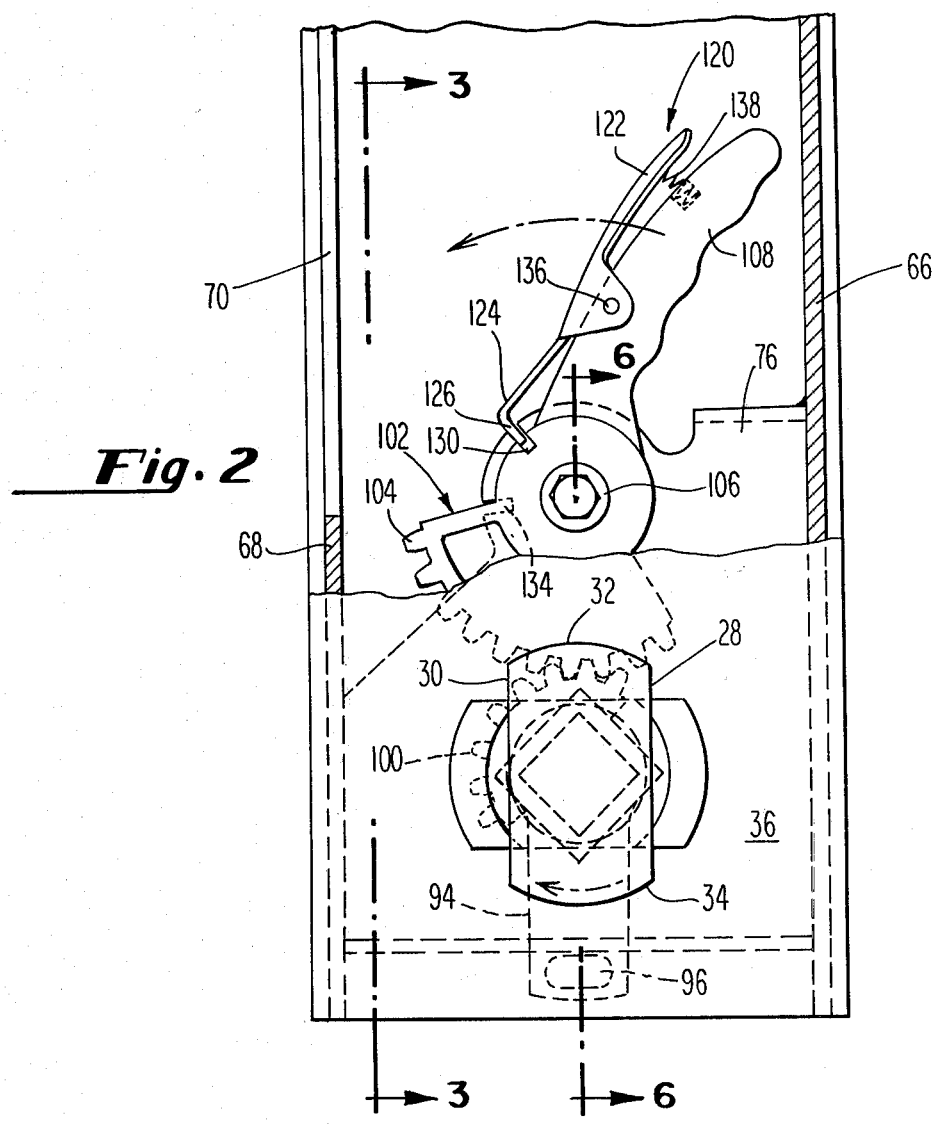
FIG. 2 is an enlarged side view of the encircled portion of FIG. 1, parts being broken away and shown in section to disclose details.

Indicated generally at 10 is a conventional chassis comprising spaced longitudinal rails 12 and supporting tandem axle wheel-sets 14, landing gear 16 and front and rear transverse bolsters 18 and 20. A standard container 22 having lower corner members or castings with oval apertures (not shown) is adapted to be mounted on the chassis and held in place by front and rear twist locking pins.

The twist lock is generally indicated at 24 and comprises a tapered head 26 whose length exceeds its width, whose sides include flats 28 and 30 and whose ends 32 and 34 are arcuate.

The upper wall 36 of the bolster contains a circular hole 38 adjacent each of its ends into which fits the boss 40 of a collar 42, the collar being secured to the bolster wall by welding as at 43. The portion of the collar 42 above the bolster wall has a shape and dimension complementary to that of head 26.

The head 26 is integral with a shank 44, there being a boss 46 beneath the bottom flat face 48 of the head, an intermediate cylindrical portion 50 therebeneath and a square portion 52 at its lower end. The shank portion 50 is provided with a diametrical hole through which extends a pin 56 just below the collar portion 40 to prevent upward retraction of the locking pin when assembled in place in the bolster.

Figure 5:
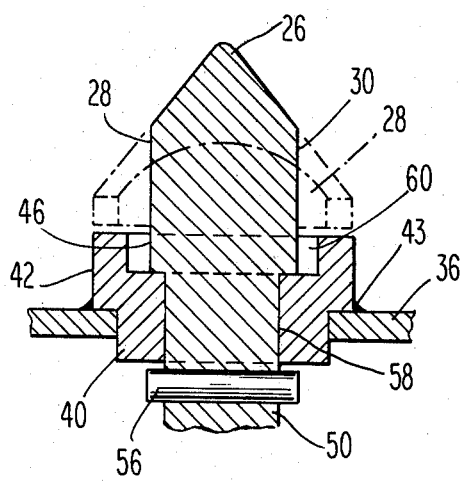
FIG. 5 is a sectional view taken on the line 5—5 of FIG. 3.

The collar 40, 42 includes a circular hole 58 through which the cylindrical portion 50 of the shank extends rotatably. The collar 40, 42 also includes a cavity 60, see FIG. 5, shaped and dimensioned to rotatably receive the boss 46 of the shank.

The bolster also includes a bottom wall 62, end walls 64 extending downwardly part way from the upper wall 36, a front wall 66 and a rear wall 68 with a relatively large access opening 70 therein. Welded to the bottom wall 62 as at 72, as well as to the front and rear walls, is a generally U-shaped support member 74 having an upper horizontal plate 76 extending between the upper and lower walls 36 and 62 of the bolster, the plate 76 having a hole 78 axially aligned with the hole 58 in the upper bolster plate 36 and another hole 80 for a purpose soon to appear.

A bearing 82 is provided having a square bore 84 which receives the square portion 52 of the shank and is rotatable therewith, the bearing 82 including a shoulder 86 which bears on the horizontal plate 76 and a boss 88 which extends rotatably through the hole 78 in the plate 76. A generally Z-shaped tab 90 has a square opening 92 which receives the square portion 52 of the shank and rests upon the upper surface of the bearing 82, one leg 94 of which extends partially beyond the end wall 64 of the bolster and includes a slot 96, the member 90 serving as a railroad tie-down latch to enable banding (not shown) to be put at the extreme outboard ends of the bolster.

Integral with or secured to the bearing 82 at the inboard side thereof is a first gear quadrant 98 having teeth 100. A second gear guadrant 102 is provided having teeth 104 which engage or mesh with the teeth 100 of the first gear quadrant 98. The second gear quadrant 102 extends from one side of a hub 106 and includes a handle 108 which extends from the opposite side of the hub.

The hub includes a boss 110 which extends through the hole 80 so that the second gear quadrant 102 and boss 110 rotate on the horizontal plate 76 around the hole 80, the axis of rotation of the first and second gear quadrants and the shank of the locking pin being parallel. A headed bolt 112 extends through the hub 106 and at the threaded end 114 thereof is secured thereto by a nut 116. The boss 110 is slightly larger than the thickness of the plate 76 so that the nut 116 when tightened has the washer 118 bear on the boss whereby the whole assembly can rotate in hole 80. This eliminates from the in-service maintenance man and assembler in the factory the problem of providing the right tension on the bolt. The bolt can be clamped as tight as possible without adversely effecting the rotational ability of the handle.

A latch 120 is provided in the form of a bar 122, one end 124 of which contains inwardly bent hooks or forks 126 and 128. The hub has slots 130 and 132 and the plate 76 which supports the handle and hub also contains two slots 134. The latch is pivoted intermediate its ends as at 136 to the handle and a spring 138 is interposed between that portion of the latch opposite its hooks, this spring normally urging the hooks into engagement with the hub slots 130 and 132 and the handle support slots 134. It will thus be seen that the handle and latch extend generally longitudinally of the bolster whereas the locking pin extends vertically thereof.

Figure 3:
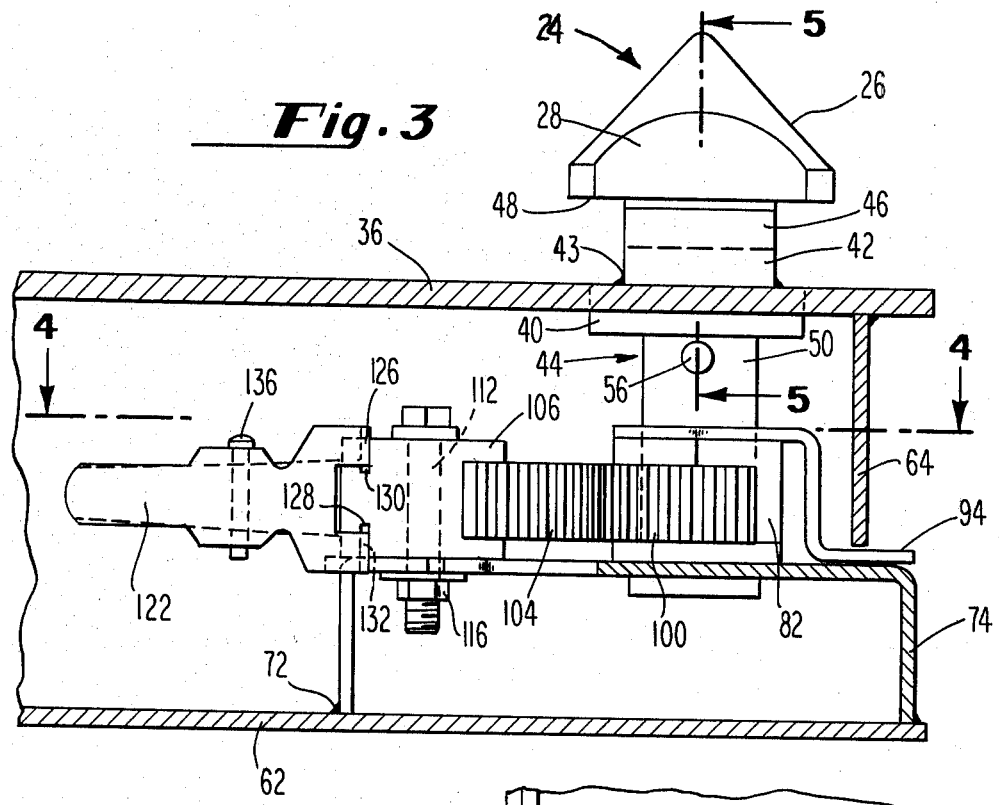
FIG. 3 is a sectional view taken on the line 3—3 of FIG. 2 showing the pin in its locking position.
Figure 4:
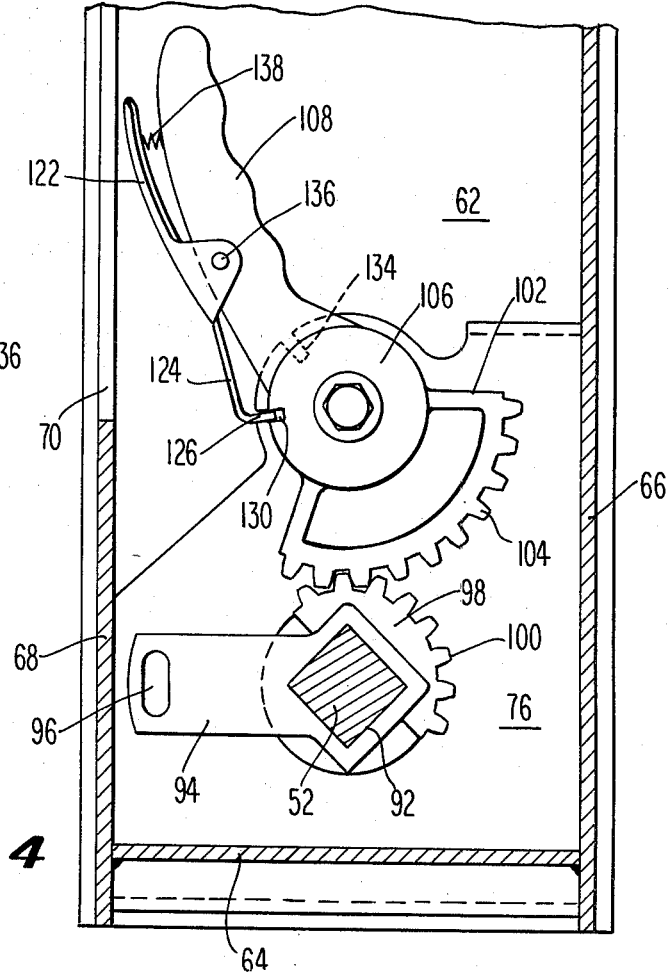
FIG. 4 is a sectional view taken on the line 4—4 of FIG. 3 but showing the pin in its unlocked position.
Figure 6:
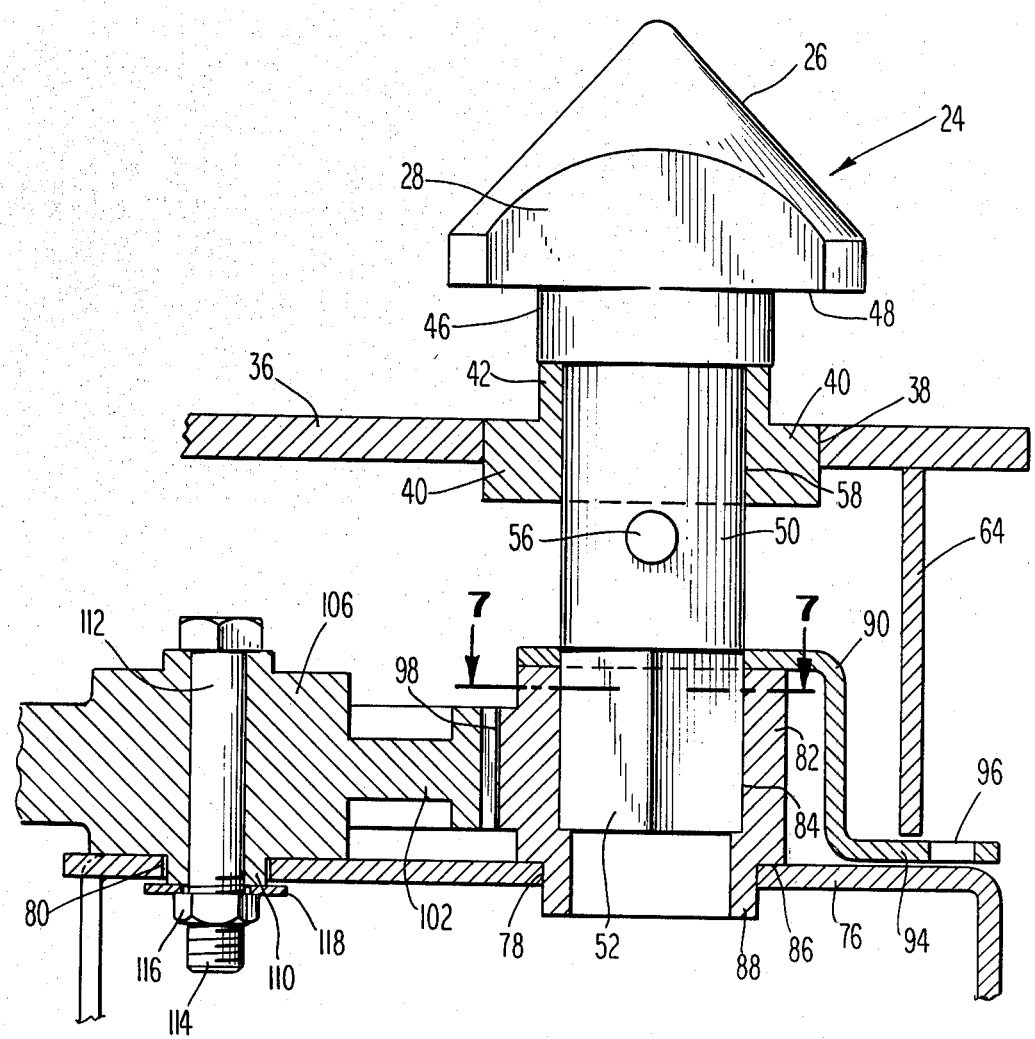
FIG. 6 is a sectional view taken on the line 6—6 of FIG. 2.
Figure 7:
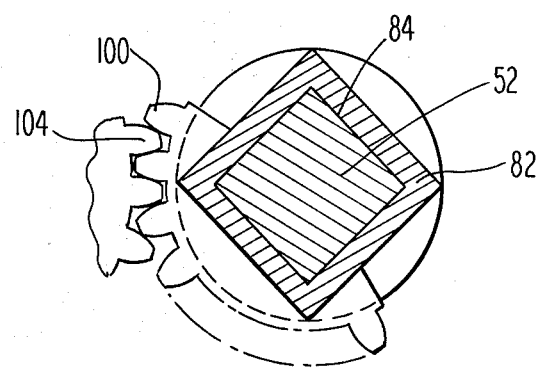
FIG. 7 is a sectional view taken on the line 7—7 of FIG. 6.

In operation, starting with the position shown in FIG. 4 in which the twist lock is in its unlocked position, that is, the head 26 is aligned with the complementary hole in the corresponding hollow corner member of the container, the container is lowered onto the chassis to the point where the head 26 and collar 42 extend into the corner member. Then, the hand is inserted through the opening 70 of the wall 68 of the bolster, grasps the handle and depresses the latch bar 122 against action of its spring 138 until its end hooks 126 and 128 are retracted from the hub slots 130 and 132 and the handle support slots 134. The handle is then pushed towards the bolster wall 66 whereupon the rotation of the gear quandrants 102 and 98 cause the shank and head to rotate 90° to the locked position in which the head 26 traverses the collar 42 and container hole as shown in FIG. 3. In this position, banding (not shown) will be put on the tab 90 through its slot 96 permitting a ready visual check that the lock is secure without having to get underneath the container. To unlock the container from the chassis, the hand is inserted through the opening 70 of the bolster wall 68, the handle is grasped, the latch is depressed and the handle is pulled toward the bolster wall 68 whereupon the meshing gear quadrants 102 and 98 will rotate and cause the shank and head to rotate back 90° to the unlocked position shown in FIG. 4. In both the locked and unlocked position, the handle and latch are confined within the envelope of the bolster as are the year quadrants. Moreover; the construction of the actuating mechanism is such that the rear twist locks are interchangeable with the front twist locks, thus simplifying the required inventory of replacement parts.

It will be understood that two such twist locks will be mounted within each bolster adjacent their ends to enter into the four lower corner members of the container where they will be rotated 90° to effect locking. Also, the vertically extending twist locks here shown and described can be mounted in the rear bolster of a conventional gooseneck container which also contains horizontal locking pins associated with the front bolster of the gooseneck chassis.

It will further be understood that, while the opening 70 is shown and described as being in the rear wall 68 of the bolster and the front bolster wall 66 is solid, the actuating mechanism can be reversed 180° so that the front bolster wall will contain the opening for access to the handle and latch and rear bolster wall will be solid. In the former arrangement, as shown and described herein, dirt, salt and road splash from the rear wheels will be kept out of the actuating mechanism.

What is claimed is:

1. In a chassis for mounting a container and including front and rear bolsters having top, side and end walls; a twist lock adjacent the end of each bolster comprising a shank with a locking head thereon, said shank extending vertically through said top bolster wall and mounted for axial rotation thereon, a first gear quadrant, means mounting said first gear quadrant on said shank within said bolster for rotation with said shank, a second gear quadrant meshing with said first gear quadrant, means mounting said second gear quadrant within said bolster for rotation about an axis parallel to said shank axis, a handle extending from said means mounting said second gear quadrant whereby movement of the handle in one direction toward one of said bolster side walls will twist said shank and head 90° to its locked position and movement of the handle in an opposite direction will twist said shank and head 90° back to its unlocked position, and a releasable latch to selectively latch said second gear quadrant against rotation and to unlatch it to permit its rotation by said handle, said gear quadrants, handle and latch being confined between said sidewalls in both the locked and unlocked positions.

2. The twist lock mechanism of claim 1 wherein the front wall of the rear bolster is solid and the rear wall includes the access opening so that dirt, salt and splash from the rear wheels of the chassis are kept from impinging upon the latch, handle and gear quadrants.

3. The twist lock mechanism of claim 1 wherein said means mounting said first gear quadrant on said shank for rotation therewith includes a square portion of said shank and a bearing carrying said first gear quadrant and including a square bore receiving said square portion of said shank.

4. The twist lock mechanism of claim 1 wherein said means mounting said second gear quadrant includes a horizontal support member with a hole therein and secured in said bolster beneath its top wall, a hub bearing on said support member and including a boss extending rotatably in said hole, and bolt means securing said hub on said support member so that said hub is rotatable thereon.

5. The twist lock of claim 4 wherein said support member includes a second hole, said first gear quadrant bearing including a portion bearing on said support member and a boss extending rotatably into said second hole.

6. The twist lock mechanism of claim 4 wherein said releasable latch includes at least one slot in said hub and a further slot in said support member, a latch bar pivoted intermediate its ends to said handle and including an end hook, and spring means urging said end hook into engagement in said slots to latch said second gear quadrant against rotation, whereby depression of the latch bar against action of the spring means will remove said hook from said slots and allow the handle to rotate said second gear quadrant.

7. The twist lock mechanism of claim 6 wherein two slots are provided in said hub and one in said support member and said latch bar includes two spaced end hooks, said spring means urging said two end hooks into said hub slots and one of said end hooks also into said support member slot.

8. A twist lock comprising a shank and a head thereon, a support, means mounting said shank for rotation about its axis on said support with said head extending beyond said support, a first gear quadrant, means mounting said first gear quadrant on said shank for rotation therewith, a second gear quadrant, means mounting said second gear quadrant for rotation around an axis parallel to that of said shank, said second gear quadrant meshing with said first gear quadrant, a handle extending from said means mounting said second gear quadrant so that movement of said handle in one direction will twist said shank and head 90° to a locking position and movement of said handle in an opposite direction will twist said shank back 90° to an unlocking position and a releasable latch to selectively latch said second gear quadrant against rotation and to unlatch it to permit its rotation by said handle.

9. The twist lock of claim 8 wherein said support is a hollow box member, said first and second gear quadrant and handle being at all times confined within said hollow member, one of whose walls including an opening for access to said handle.

10. The twist lock of claim 8 wherein said means mounting said first gear quadrant on said shank for rotation therewith includes a square portion of said shank and a bearing carrying said first gear quadrant and including a square bore receiving said square portion of said shank.

* * * * *